United States Patent
Gamborg et al.

[11] Patent Number: 5,942,162
[45] Date of Patent: Aug. 24, 1999

[54] TWO-PHASE DOWNFLOW LIQUID DISTRIBUTION DEVICE

[75] Inventors: Morten Müller Gamborg, Fredensborg; Benny Normann Jensen, Farum, both of Denmark

[73] Assignee: Haldor Topsoe A/S, Lyngby, Denmark

[21] Appl. No.: 08/993,308

[22] Filed: Dec. 18, 1997

Related U.S. Application Data

[60] Provisional application No. 60/033,501, Dec. 19, 1996.

[51] Int. Cl.[6] .................................................. B01F 3/04
[52] U.S. Cl. ........................... 261/96; 261/97; 261/109; 261/110; 261/114.1
[58] Field of Search ......................... 261/96, 97, 108, 261/109, 110, 173, 114.1, 114.2, 114.3, 114.4, 114.5

[56] References Cited

U.S. PATENT DOCUMENTS

| | | | |
|---|---|---|---|
| 2,125,343 | 8/1938 | Hochschwender et al. | 261/97 |
| 2,416,724 | 3/1947 | Whaley | 261/114.2 |
| 3,353,924 | 11/1967 | Riopelle | 422/191 |
| 3,524,731 | 8/1970 | Effron et al. | 261/97 |
| 3,598,539 | 8/1971 | Pizzato | 261/97 |
| 3,824,080 | 7/1974 | Smith et al. | 261/97 |
| 3,972,966 | 8/1976 | Lund et al. | 261/114.2 |
| 4,126,540 | 11/1978 | Grosboll et al. | 261/97 |
| 4,140,625 | 2/1979 | Jensen | 261/96 |
| 4,836,989 | 6/1989 | Aly et al. | 422/195 |
| 4,960,571 | 10/1990 | Bhagat et al. | 261/114.1 |
| 5,158,714 | 10/1992 | Shih et al. | 261/114.2 |
| 5,192,465 | 3/1993 | Petrich et al. | 261/97 |

FOREIGN PATENT DOCUMENTS

| | | | |
|---|---|---|---|
| 580128 | 7/1959 | Canada | 261/114.1 |
| 877018 | 9/1961 | United Kingdom | 261/114.2 |

*Primary Examiner*—C. Scott Bushey
*Attorney, Agent, or Firm*—Ostrolenk, Faber, Gerb & Soffen, LLP

[57] ABSTRACT

A liquid-vapor distribution device for use in two-phase concurrent downflow vessels including a level, horizontal tray fabricated and installed so as to be essentially leak free at the junctions of the tray and the vessel wall, the horizontal tray being perforated with holes of equal size, the holes being distributed in an optimized pattern over the surface of the horizontal tray, each perforation through the horizontal tray being fitted with a vapor lift tube.

9 Claims, 5 Drawing Sheets

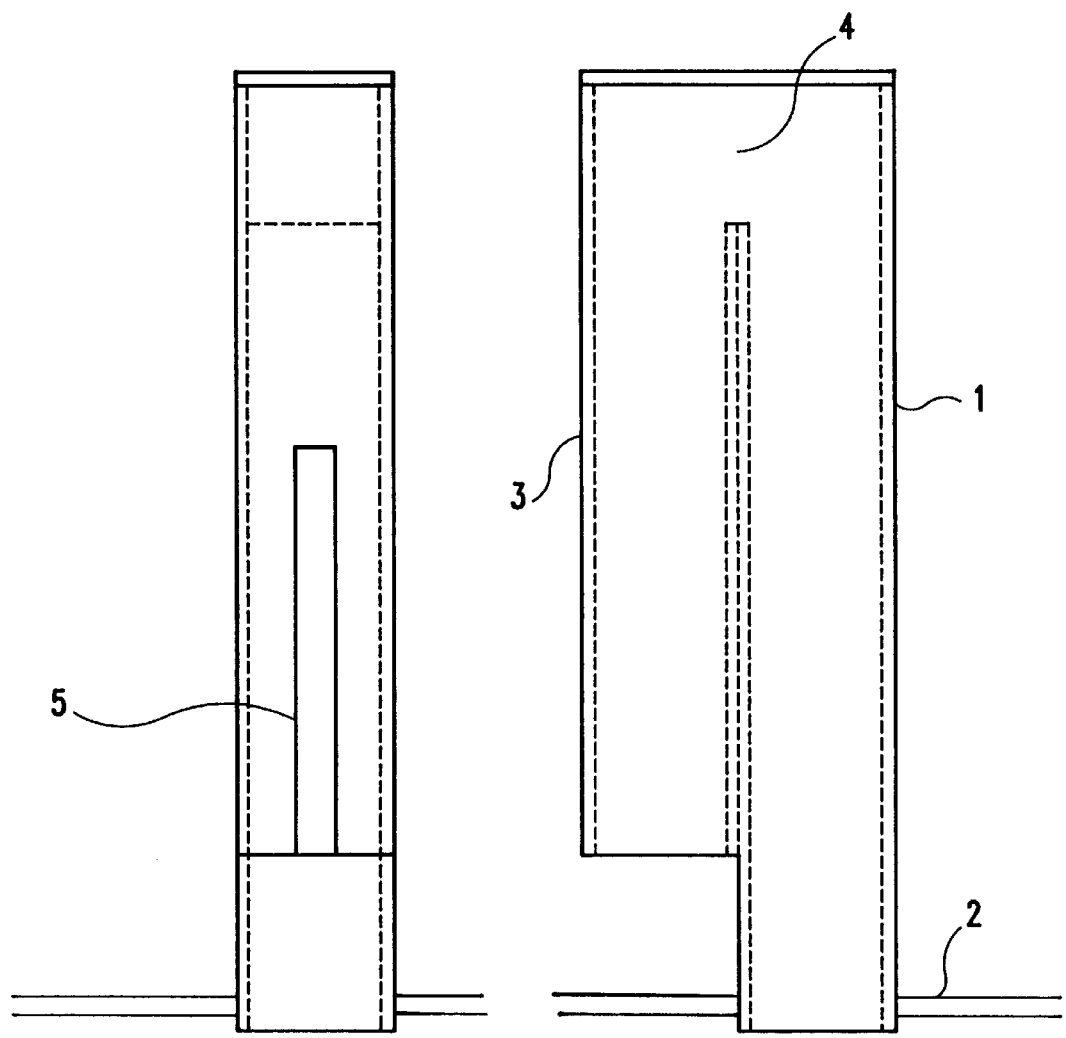

TWO-PHASE DOWNFLOW LIQUID DISTRIBUTION DEVICE

This application claims the benefit of U.S. Provisional Application Ser. No. 60/033,501, filed Dec. 19, 1996 now abandoned.

BACKGROUND OF THE INVENTION

The present invention concerns a liquid distribution tray device that improves liquid distribution over the cross sectional area of a vessel following the tray. The device also intimately contacts the liquid and vapor phases to achieve thermal and compositional equilibrium. The device is typically used in a hydroprocessing reactor.

Most of the known designs of liquid distribution devices fall into one of four categories. The first is a series of troughs and overflow weirs to systematically subdivide the liquid into multiple streams before it contacts the bed. This type is often used in liquid contractors or countercurrent absorbers. An example of this type is described in U.S. Pat. No. 5,192,465.

A second type of liquid distribution device is a perforated horizontal tray. This may or may not have notched weirs around the perforations. The tray may also have chimneys for vapor flow. This type of distribution device can be used for rough liquid distribution in conjunction with a more sophisticated final liquid distribution tray. Examples of this type are disclosed in U.S. Pat. No. 4,836,989.

The third common type of liquid distribution device is a chimney tray. This device uses a number of standpipes laid out typically on a regular square or triangular pitch pattern on a horizontal tray. The standpipes typically have holes in the sides for the passage of liquid. The tops of the standpipes are open to allow vapor flow down through the center of the chimneys. Some designs use special vapor downcomer chimneys to handle the bulk of the vapor flow. This type is known from U.S. Pat. No. 4,126,540 and U.S. Pat. No. 3,353,924.

The fourth type of liquid distribution device is a bubble cap tray. This device uses a number of bubble caps laid out on a regular pitched pattern on a horizontal tray.

The bubble cap is a cap centered concentrically on a standpipe. The sides of the cap are slotted for vapor flow. Liquid flows under the cap and, together with the vapor, flows upward in the annular area and then down through the center of the standpipe as described in U.S. Pat. No. 5,158,714.

SUMMARY OF THE INVENTION

The device of the present invention is termed a "vapor lift distribution tray". It is horizontally supported in the vessel. The tray can be either a sectionalized or solid plate. Whether sectionalized or solid, all tray edges are gasketed or otherwise sealed to provide an essentially leak free surface.

The tray is perforated by evenly spaced holes across its surface. The holes may be round, square, rectangular or any other geometric shape. The holes are optimally spaced on either a square, triangular, radial or other symmetrical pattern. If the horizontal tray is sectionalized, the perforation holes may be located optimally on each tray section. In all cases, an optimized pattern is used to provide approximately even spacing between all perforations and to provide an approximately even ratio of perforation hole area to horizontal tray area across the entire horizontal tray.

Each perforation is fitted with an inverted "U"-shaped device termed a "vapor lift tube". The vapor lift tubes are attached to the tray in such a way as to be leak tight.

On the underside of the tray, a drip edge is established for each perforation. This is achieved by having the vapor lift tube extend through the tray, by having a separate piece attached to the tray, by having the tray extruded down, or by some other equivalent means.

BRIEF DESCRIPTION OF THE DRAWINGS

FIGS. 1A, 1B and 1C show the side elevation, the front elevation and a top view, respectively, of a first embodiment of the vapor lift tube of the present invention.

DETAILED DESCRIPTION OF THE PREFERRED EMBODIMENT

Figure 2C:
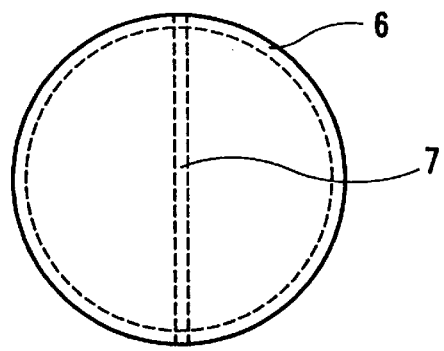
FIGS. 2A, 2B and 2C.

The vapor lift tube design concept is shown in FIG. 1. One leg (downflow tube 1) of the inverted "U" fits over or through a perforation in the support tray 2. The other leg (upflow tube 3) is shorter so that it is elevated above the tray. The ends of both legs are open. At the top of the inverted "U", there is an internal opening 4 between the legs. The device thereby provides a flow path across the tray—inlet through the end of the short leg, vertical flow through the short leg, direction change at the top of the inverted "U", downflow through the long leg and discharge through the open end of the long leg below the tray.

A vertical slot 5 is cut into the side of the short leg opposite the longer leg. The top of the slot is at or below the bottom of the internal opening between legs. Alternatively, two or more slots could be cut into the short leg sides adjacent to or opposite the longer leg.

In operation, a liquid level will be established on the tray. The liquid level on the vapor lift tube will be above the bottom of the short leg but below the top of the slot in the short leg. Vapor will pass through the slot in the short leg creating a pressure drop between the inside and outside of the vapor lift tube. Due to the lower pressure inside the vapor lift tube, the liquid level will be higher inside than outside the vapor lift tube. The vapor and liquid will mix in the shorter leg with the vapor lifting the liquid to flow up and over the connecting wall between the shorter and longer legs. Liquid will partially disengage, while flowing over the connecting wall and down the longer leg. At the opening under the tray, the liquid and vapor will further disengage with the liquid draining off the drip edge.

Figures 2A, 2B:
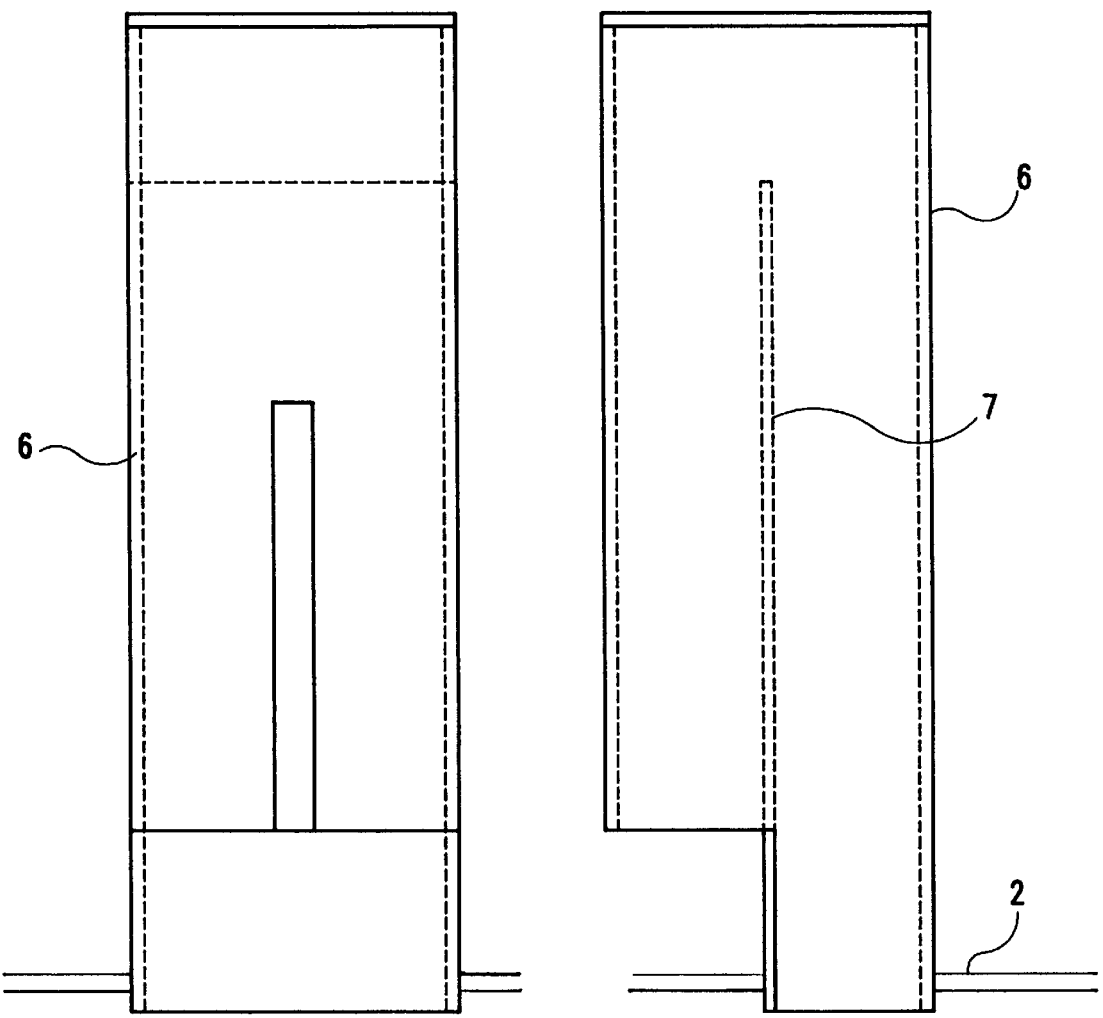
Figure 3C:
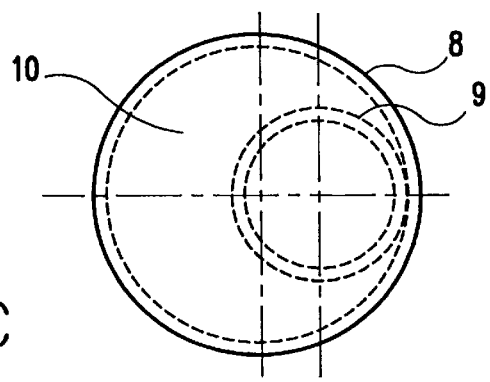
FIGS. 3A, 3B and 3C.
Figures 3A, 3B:
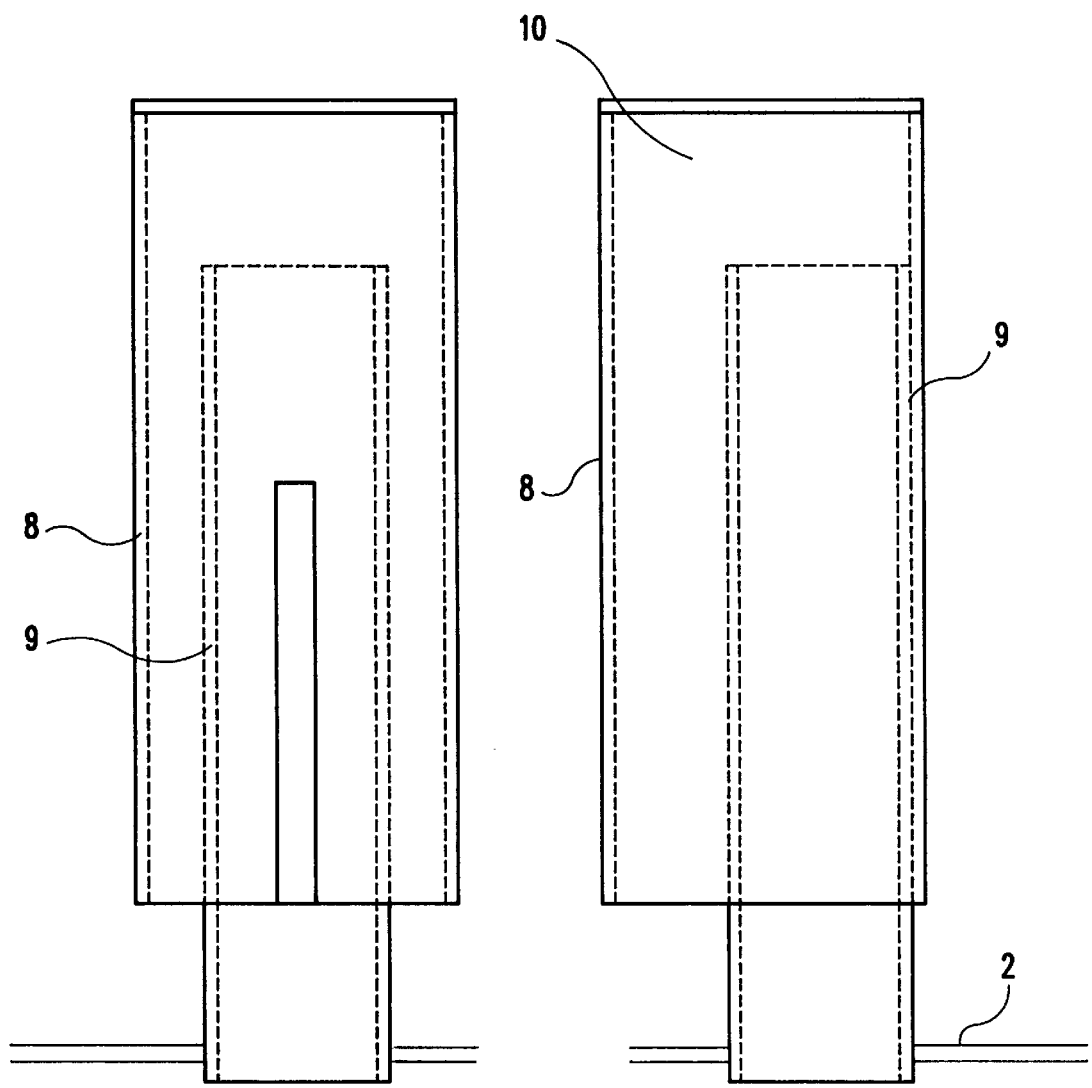
Figure 4C:
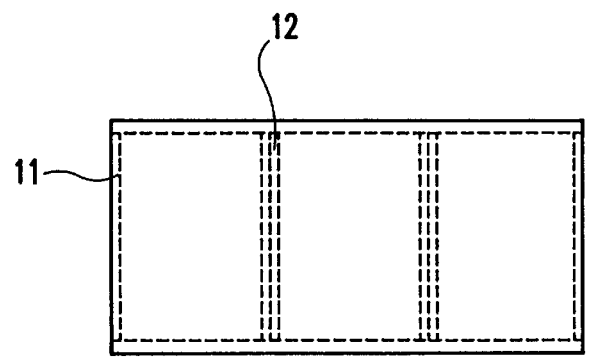
FIGS. 4A, 4B and 4C.
Figure 4A:
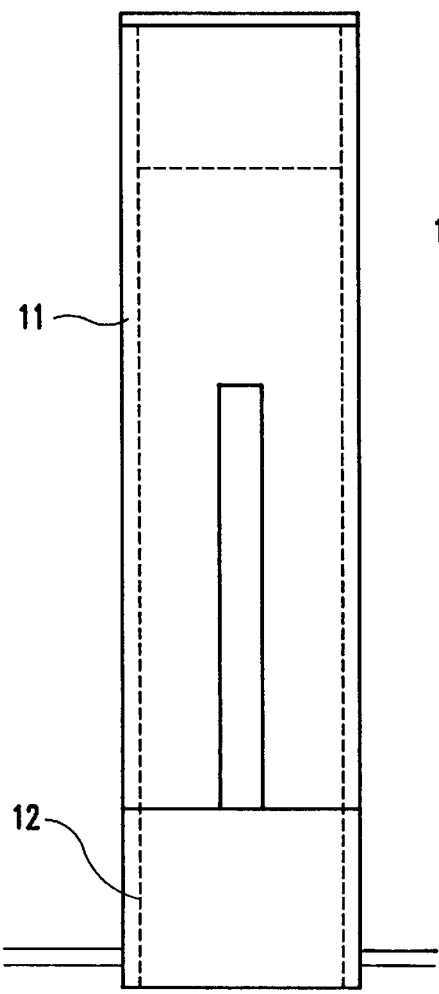
Figure 4B:
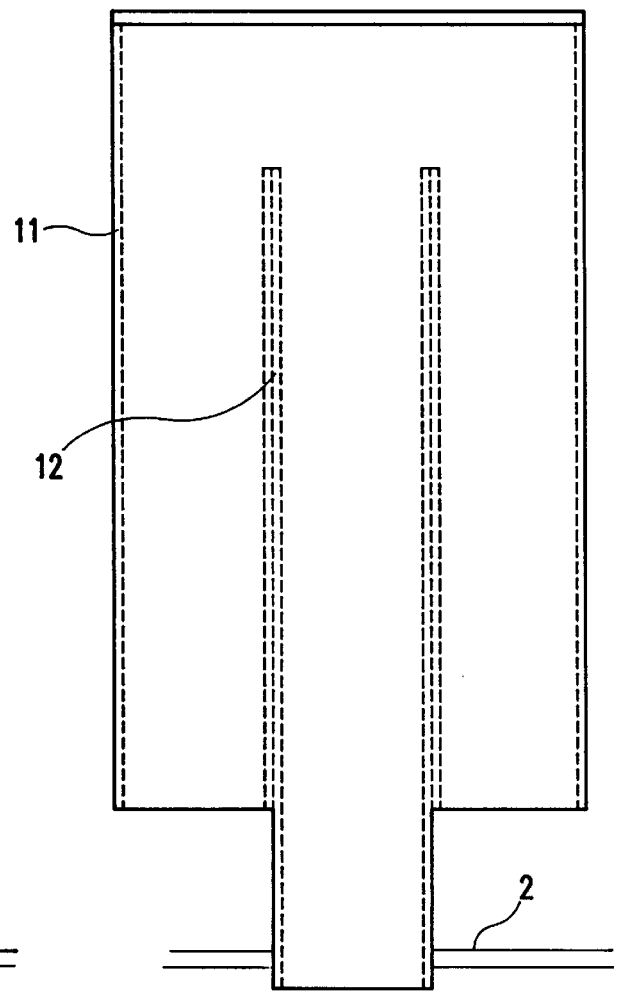
Figure 5C:
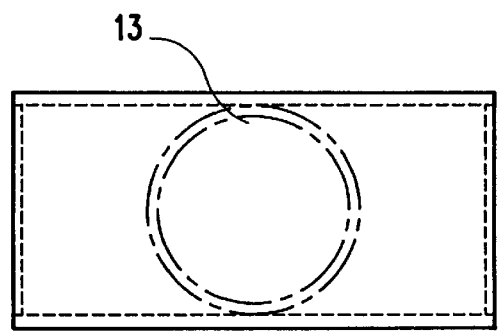
FIGS. 5A, 5B and 5C show alternative embodiments of the vapor lift tube of the present invention.
Figure 5A:
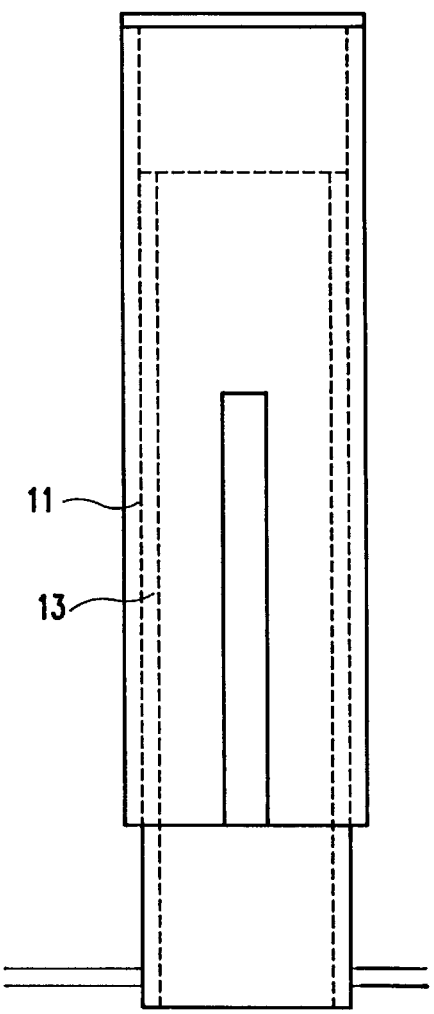
Figure 5B:
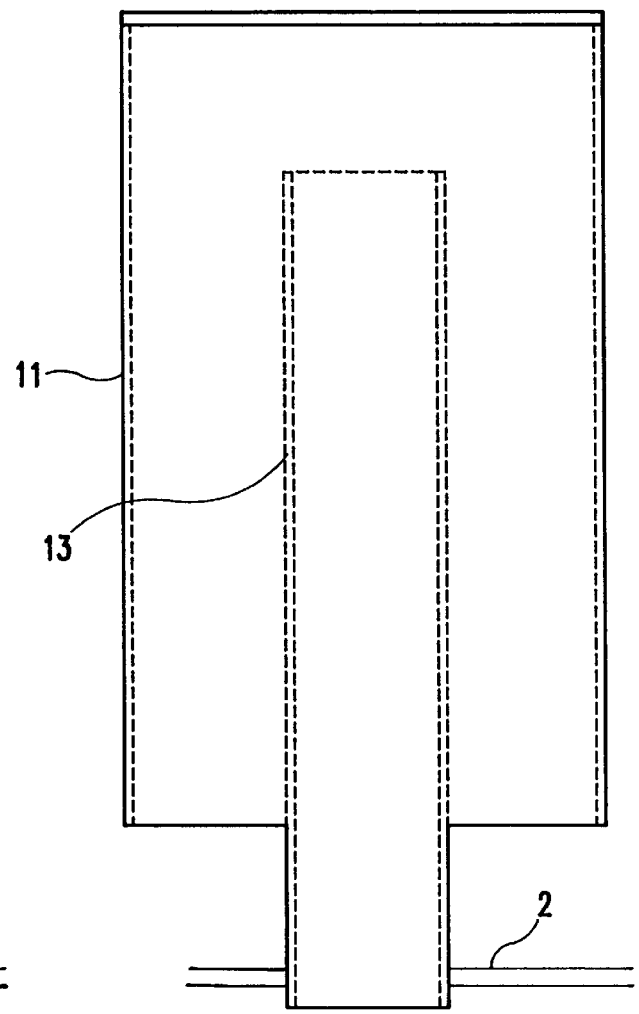

Alternative versions of the vapor lift tube design are shown on FIG. 2, 3, 4 and 5. In FIG. 1, the legs of the inverted "U" have square or rectangular cross sections. In FIG. 2, the device is composed of a single round tube 6 with a vertical baffle 7 to form the short and long legs. In FIG. 3, the device is composed of a pair of non-concentric round tubes, 8 and 9. The long leg is the smaller diameter tube 9 while the short leg is the annular space 10 inside the larger diameter tube 8. In FIG. 4, an "M" shaped device is used with the outer legs 11 being the equivalent of the short legs and the middle leg 12 being the equivalent of the long leg. This version would be used where there is high liquid and vapor loadings. FIG. 5 is the same basic concept as FIG. 4 with the exception that the center leg is a round tube 13. In all versions, the top has been illustrated as being a flat plate. The top could also be rounded, domed, peaked or any other geometry.

The preferred version of the vapor lift tube is the design shown in FIG. 5. This version can be designed to operate over a wide range of vapor-liquid loads, maintains the geometric relationships necessary for functionality and can be fabricated economically and efficiently. In a preferred embodiment, the horizontal tray is provided with a large number of small perforations, each hole area being between 1 cm$^2$ and 25 cm$^2$. The total perforation hole area is between 4 and 33% of the horizontal tray surface area. The ratio of the upflow cross section area to the perimeter is preferably above 4 mm to reduce frictional pressure drop and wall effects.

The known trough type distribution device is mechanically complex and very sensitive to levelness. Depending on the design of the transitions between troughs, the quality of the distribution may also be susceptible to fouling.

The known perforated plate design is similar to the chimney design. The chimney design is preferred since it can be designed for a wider range of liquid/vapor loadings and is less susceptible to fouling.

The advantages of a vapor lift tube device according to the invention over a chimney type design is the significantly wider turndown range possible with the vapor lift tube. As the liquid flow decreases, a properly designed chimney must either become taller or have smaller holes drilled in the side. Due to fabricating tolerances, care of installation and deflection due to operating load, not all of the distribution devices will be at the same level in the vessel. At some level of turndown, some holes will be covered with liquid and others will not. This results in uneven liquid distribution over the surface below the tray. With proper design, the vapor lift tube device will reduce the liquid flow difference between vapor lift tubes at different elevations better than what can be achieved with a chimney type design. A further advantage of the vapor lift tube over the chimney type design is the increased contacting of the liquid and vapor phases. The intimate contacting that occurs in the upflow portion of the vapor lift tube provides closer approaches to thermal and compositional equilibrium than would be achieved in the chimney tray.

The vapor lift tube device is similar to the bubble cap device in concept but has several advantages. Since the vapor lift tube device is smaller, more can be placed on a distribution tray to achieve better distribution of liquid. Furthermore, since typical spacing patterns are square or triangular pitch, there are usually gaps in liquid distribution coverage near the vessel wall. With a smaller spacing, the size of these gaps are smaller. Overall wetting efficiency below the tray is better with a smaller pitch than with a larger pitch. The bubble cap design tray is limited to relatively large spacing and additional measures have been attempted to improve the liquid flow from the cap, e.g. the shear plate described in the Shih patent. Increasing the number of bubble caps with reduced spacing would increase the number of distribution points, but would negatively impact on the liquid/vapor flow relationships through each cap. Using more bubble caps would require making the bubble caps smaller with either smaller slots or fewer slots. Using smaller slots is not practical since there is a minimum slot size for fouling considerations. Using fewer slots is not desirable since that may lead to channelling of the vapor in the annulus and less efficient contacting with the liquid phase. A further advantage for the vapor lift tube device is that its simplicity makes it easier and less costly to fabricate in the optimal size prescribed by the process conditions.

In many processes where this tray will be used, e.g. hydroprocessing reactors, there can be wide variations in the vapor and liquid phase rates and physical properties over time and during turndown operations. Due to fabricating tolerances and the care of installation, there will be unavoidable variations in the distribution tray levelness. Liquids dropping onto the distribution tray from an inlet distributor or quench zone mixer may be unevenly distributed and could result in liquid height gradients across the tray due to splashing, waves or hydraulic head. An optimized liquid distributor design using the vapor lift tube concept is possible that will provide better liquid distribution below the tray than can be obtained from optimized designs of trough distributors, simple perforated plate distribution trays, chimney type distribution trays or concentric bubble cap distribution trays.

The liquid distribution trays of this invention will typically be used in hydroprocessing reactors. By obtaining even distribution of the liquid reactants over the entire reactor cross sectional area, all the catalyst at a given level is evenly wetted. Thus, all the catalysts at a given level operate at the same efficiency, which increases the overall efficiency of the reactor. Additionally, even liquid distribution maintains even radial temperature profiles across the reactor. This results in minimizing peak reactor temperatures which, over time reduces coking and catalyst deactivation rate. Consequently, the reactor operates more efficiently and with a longer cycle length. Value is achieved by reduced catalyst requirements, higher processing capability and/or longer cycle lengths. The device will work for any two phase downflow reactor or contactor. Typical applications would be in hydrotreating, hydrocracking, aromatic saturation, catalytic dewaxing and hydrofinishing reactors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A liquid-vapor distribution device for use in two-phase concurrent downflow vessels, comprising:

a level, horizontal tray fabricated and installed so as to be essentially leak free at the junctions of the tray and the vessel wall, said horizontal tray being perforated with holes of equal size, the holes being distributed in an optimized pattern over the surface of the horizontal tray, each perforation through the horizontal tray being fitted with a vapor lift tube and wherein an upflow tube portion is adapted to fit against a downflow tube so as to limit an upflow zone to substantially one side of the downflow tube.

2. The liquid-vapor distribution device of claim 1, wherein the vapor lift tube is an inverted "U" shaped device consisting of a downflow tube portion and an upflow/transition tube portion and wherein:

the downflow tube portion is a tube or channel with the same geometric cross sectional shape as the perforation, the downflow tube is attached to the horizontal tray by means to make a leak proof seal; and optionally, the bottom of the downflow tube extends through the horizontal tray to provide a drip edge, to provide for even disengagement of liquids passing through the downflow tube to enhance liquid distribution.

3. The liquid-vapor distribution device of claim 2, wherein the downflow tubes are the same height at all points on the horizontal tray.

4. The liquid-vapor distribution device of claim 2, wherein the upflow/transition tube portion of the vapor lift tube is a tube or channel that produces an upflow zone adjacent to the downflow tube and a transition flow zone at the top of the downflow tube, so that vapor and liquid flow upwards through the upflow tube, change direction in the transition zone and downwards through the downflow tube and tray, thereby providing a conduit across the horizontal tray.

5. The liquid-vapor distribution device of claim 2, wherein the upflow tube portion of the vapor lift tube will have one or more vertical slots cut into its side, whereby the vapor phase flows into the upflow section of the vapor lift tube and mixes with the liquid phase, the slot height ending at or below the elevation of the top of the downflow tube.

6. The liquid-vapor distribution device of claim 2, wherein the bottom of the upflow tube portion will terminate above the level of the horizontal tray so the liquid is not impeded from flowing into the bottom of the upflow tube.

7. The liquid-vapor distribution device of claim 1, wherein the horizontal tray is provided with a large number of small perforations having each hole area between 1 $cm^2$ and 25 $cm^2$.

8. The liquid-vapor distribution device of claim 1, wherein the total perforation hole area is between 4 and 33 percent of the horizontal tray surface area.

9. The liquid-vapor distribution device of claim 1, wherein the upflow cross section area to perimeter ratio is above 4 mm to reduce frictional pressure drop and wall effects.

* * * * *